Feb. 6, 1951 K. WILLIAMS 2,540,561
FRICTION SHOCK ABSORBING MECHANISM
Filed April 25, 1946
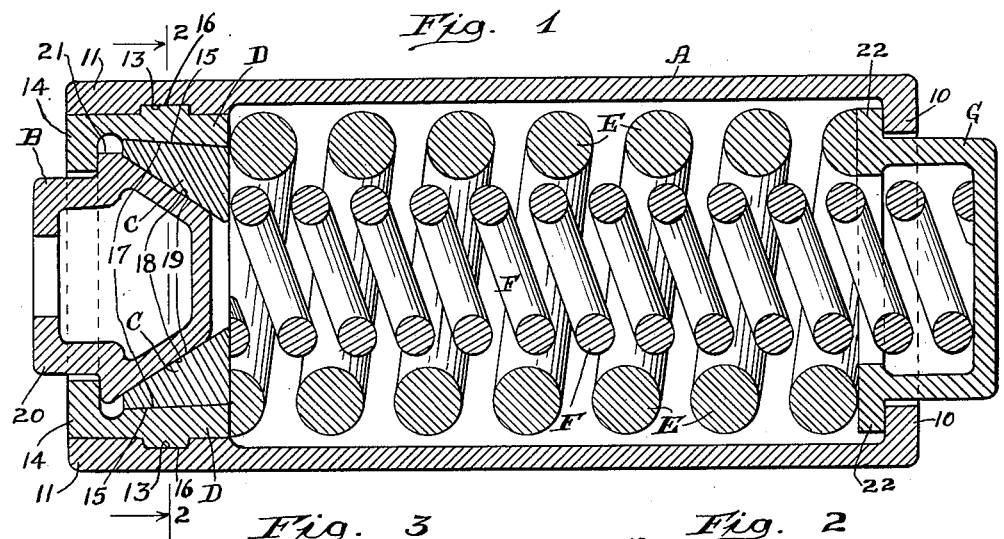
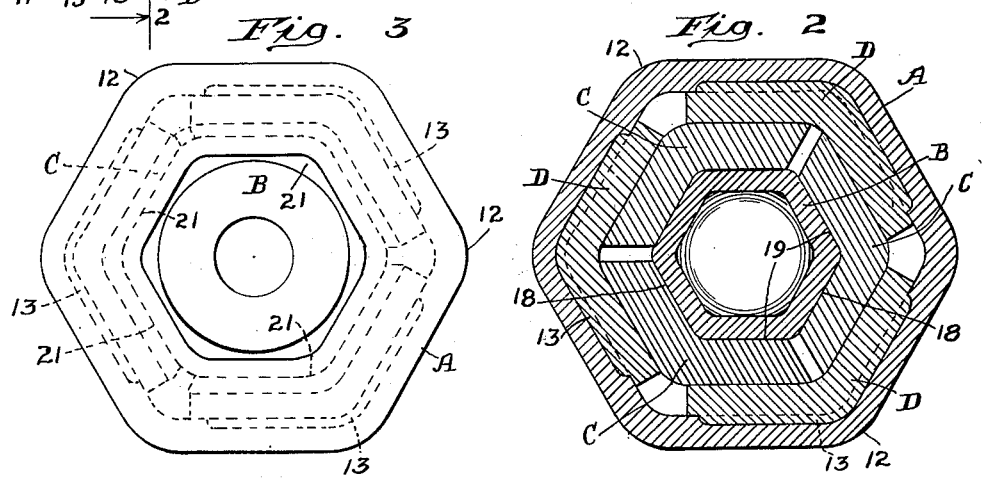
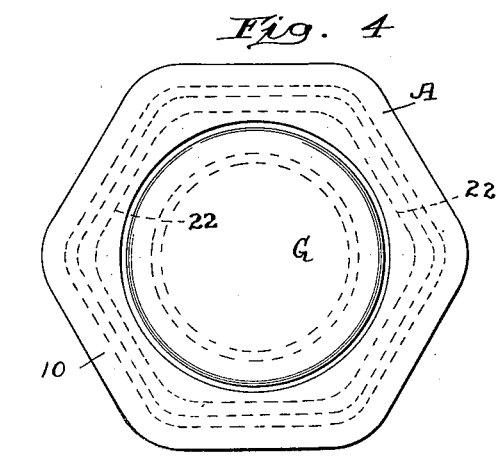
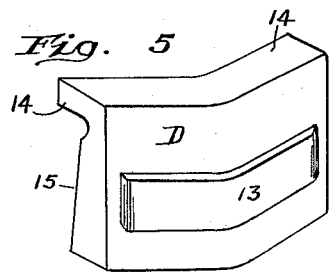
Inventor:
Keith Williams.
By George I. Haight
Atty.

Patented Feb. 6, 1951

2,540,561

UNITED STATES PATENT OFFICE 2,540,561

FRICTION SHOCK ABSORBING MECHANISM

Keith Williams, Buffalo, N. Y.

Application April 25, 1946, Serial No. 664,805

10 Claims. (Cl. 213—34)

This invention relates to improvements in friction shock absorbing mechanisms, especially adapted for railway draft riggings.

One object of the invention is to provide a friction shock absorbing mechanism comprising a casing, a friction clutch including friction shoes and a central wedge block, slidingly telescoped within the casing, and spring means within the casing yieldingly opposing inward movement of the clutch, wherein the parts are held assembled by liners interposed between the casing walls and shoes, having shouldered engagement with the casing and wedge block to limit outward movement of the block, the liners and shoes being provided with cooperating friction surfaces.

Other objects of the invention will more clearly appear from the description and claims hereinafter following.

In the drawing forming a part of this specification,

Fig. 1 is a longitudinal vertical sectional view of my improved shock absorbing mechanism;

Fig. 2 is a transverse vertical sectional view, corresponding substantially to the line 2—2 of Fig. 1;

Fig. 3 is a front elevational view, looking from left to right in Fig. 1;

Fig. 4 is a rear elevational view, looking from right to left in Fig. 1; and

Fig. 5 is a detail perspective view of a liner employed in my improved mechanism.

As illustrated in the drawing, my improved shock absorbing mechanism comprises broadly a casing A; a wedge block B; three friction shoes C—C—C; three liners D—D—D; a spring resistance comprising spring elements E and F; and a preliminary spring cap G.

The casing A is in the form of a tubular shell of hexagonal, interior and exterior cross section, having an inturned flange 10 at the rear end thereof. At the forward end, the walls of the casing are inwardly thickened, as shown, to provide a reinforced friction shell section 11. Rearwardly of the section 11, the casing is provided with a spring cage portion. The corners of the hexagonal casing are preferably rounded off, as indicated at 12.

The liners D, which are three in number, are of similar design, each liner being in the form of a relatively heavy plate of V-shaped transverse section having a transversely extending, relatively wide retaining rib 13 on the outer side thereof between its front and rear ends. At the front end thereof, each liner D has a laterally inwardly extending retaining flange 14, which serves as a stop to limit outward movement of the wedge block. The inner side of each V-shaped liner presents a pair of outwardly diverging friction surfaces 15—15. The three liners D—D—D are arranged symmetrically about the longitudinally central axis of the mechanism within the friction shell section 11 of the casing, being seated against the walls of said section of the casing with the ribs 13 thereof engaged in transverse grooves 16 provided in said walls. As shown, three such grooves 16 are provided, one for each liner, each groove being formed in two adjacent walls of the hexagonal casing and extending around the corner at the intersection of said adjacent walls. The corner at the intersection of the two angularly disposed sections of each V-shaped liner is preferably rounded to fit the rounded corner of the casing and the rib 13 of each liner is preferably continuous, extending around the rounded corner thereof and terminating short of the opposite side edges of said liner. The friction surfaces 15—15—15 of the three liners converge inwardly of the mechanism toward the longitudinal central axis thereof, thus providing an inwardly tapered formation for the friction shell section of the mechanism.

The friction shoes C, which are three in number, are arranged symmetrically about the central longitudinal axis of the mechanism. Each shoe C is of V-shaped transverse section and presents a pair of friction surfaces 17—17 on the outer side thereof, which are angularly disposed with respect to each other to cooperate with the friction surfaces 15—15 of two adjacent liners which the shoe overlaps. On the inner side, each shoe is provided with a wedge face 18 of V-shaped transverse cross-section.

The wedge B is in the form of a hollow block having three inwardly converging, flat wedge faces 19—19—19 at its inner end engaging respectively with the wedge faces 18—18—18 of the three shoes. The outer end of the wedge block is contracted, or of reduced size, as indicated at 20, thereby providing a stop shoulder 21. The reduced portion 20 of the block is of cylindrical form and the shoulder 21 is continuous around the wedge block and underlies the flanges 14—14—14 of the three liners D—D—D and is engageable with said flanges to limit outward movement of the block B.

The spring cap G is disposed at the rear end of the casing A and has a laterally projecting peripheral flange 22 at its inner end which engages in back of the flange 10 at the rear end of the casing to restrict outward movement of the cap.

The spring resistance, comprising the spring elements E and F, is arranged within the casing between the friction shoes and the spring cap G. The spring E is in the form of a relatively heavy, helical coil surrounding the spring F and has its front and rear ends bearing respectively on the inner ends of the shoes C—C—C and the flange 22 of the spring cap G. The spring F, which is also in the form of a helical coil, is of lighter capacity than the spring E and has its front end bearing on the inner ends of the shoes C—C—C and its rear end seated within the spring cap G.

In assembling the mechanism, the spring cap G and the springs E and F are first placed within the casing A through the open front end thereof. The wedge block B, shoes C—C—C, and the liners D—D—D, assembled as a unit and held in contracted condition by a suitable clamping tool so that the ribs 13—13—13 of the liners will pass freely through the opening of the casing, are then inserted within the casing through said open end. The contracted unit is pushed into the casing until the ribs 13—13—13 are confined by the walls of said casing, whereupon the clamping tool is removed and the unit forced further inwardly of the casing against the resistance of the springs E and F until the ribs 13—13—13 register with and snap into the grooves 16—16—16 of the casing walls. The ribs 13—13—13 are forcibly engaged within the grooves 16—16—16, due to the tendency of the unit comprising the wedge block, shoes, and liners to expand, being forced to do so by the wedging action of the block B against the spring resisted shoes C—C—C. As will be evident, the liners are thus effectively locked against accidental removal and are positively held against inward and outward movement lengthwise of the casing.

The operation of my improved friction shock absorbing mechanism is as follows: Upon compression of the mechanism between the usual front and rear followers of the railway draft rigging, the spring cap is first forced inwardly against the resistance of the springs E and F to absorb the lighter shocks. When the spring cap has been forced inwardly to its full extent, further relative approach of the followers of the railway draft rigging will force the wedge block B inwardly of the casing, sliding the friction shoes along the friction surfaces of the liners to provide relatively high frictional resistance during the last part of the compression stroke of the mechanism. Upon the actuating force being reduced, the springs E and F will return the parts to the normal full release position shown in Fig. 1, outward movement of the spring cap G being limited by engagement of the flange 22 thereof with the flange 10 at the rear end of the casing, and outward movement of the wedge block being limited by shouldered engagement with the inturned flanges 14—14—14 of the liners D—D—D which are locked against outward movement with respect to the casing.

I claim:

1. In a friction shock absorbing mechanism, the combination with a friction casing open at the front end; of liners within said casing having shouldered engagement with the walls of the casing to lock said liners against movement lengthwise with respect to the casing; friction shoes having sliding frictional engagement with the liners; a central wedge block in wedging engagement with the shoes, said liners having stop flanges overhanging the outer ends of the shoes and having shouldered engagement with the wedge block to limit outward movement of the latter; and spring means within the casing yieldingly resisting inward movement of the shoes.

2. In a friction shock absorbing mechanism, the combination with a tubular casing having an open friction shell section at one end; of detachable liners within the friction shell end of the casing having shouldered engagement with said casing to lock said liners against lengthwise movement; a central wedge block having a transverse, peripheral shoulder; friction shoes in wedging engagement with said block and in sliding frictional engagement with said liners, said liners having inturned stop flanges overhanging the outer ends of said shoes and extending into the path of movement of the shoulder of the wedge block to limit outward movement of said block; and spring means within the casing yieldingly opposing inward movement of the shoes.

3. In a friction shock absorbing mechanism, the combination with a tubular friction casing having an open friction shell section at one end; of a central wedge block; three friction shoes surrounding said block in wedging engagement therewith; a liner interposed between each shoe and the corresponding side wall of the casing, said liners having shouldered engagement with the casing to lock the liners against lengthwise movement with respect to the casing, each of said liners having an inturned flange overlying the outer end of the corresponding shoe and extending into the path of movement of said wedge block to limit outward movement of the latter, said liners and shoes having cooperating friction surfaces; and spring means within the casing yieldingly opposing inward movement of the shoes.

4. In a friction shock absorbing mechanism, the combination with a tubular friction casing of hexagonal, interior cross section; of three liners of V-shaped, transverse section within said casing, said liners being arranged symmetrically about the longitudinal central axis of the casing and each liner being seated against two adjacent walls of said hexagonal interior of the casing, said liners having transversely arranged, outwardly projecting ribs seated in transverse grooves in the walls of the casing to lock the liners to the casing against movement in lengthwise direction, said liners having lengthwise extending friction surfaces of V-shaped section on the inner sides thereof, said liners having inturned stop flanges at their outer ends; three friction shoes having friction surfaces of V-shaped, transverse section interfitting with the V-shaped friction surfaces of the liners and having lengthwise sliding engagement therewith; a central wedge block in wedging engagement with the shoes, said wedge block having a reduced projecting portion extending between the flanges of the liners, and a peripheral shoulder at the inner end of said reduced projection engageable in back of the flanges of said liners to restrict outward movement of said block; and spring means within the casing yieldingly opposing inward movement of the shoes.

5. In a friction shock absorbing mechanism, the combination with a tubular friction casing; of a central wedge block having a peripheral shoulder; a set of three friction shoes surrounding said block and having wedging engagement therewith; a liner interposed between each shoe and the corresponding interior side wall of the casing, said liners and shoes having cooperating, lengthwise extending friction surfaces; a transversely disposed, laterally outwardly extending rib on each liner seated in a locking groove in the corresponding side wall portion of the casing to lock said liner against lengthwise movement with respect to the casing, each of said liners having an inturned flange at the outer end thereof overhanging the outer end of the corresponding shoe and extending into the path of movement of the shoulder of the wedge block to limit outward movement of said block; and a spring resistance within the casing yieldingly opposing inward movement of the shoes.

6. In a friction shock absorbing mechanism having a friction casing open at the front end, liners within said casing, friction shoes having sliding frictional engagement with the liners, a central wedge block in wedging engagement with the shoes, and spring means yieldingly resisting inward movement of the shoes, the improvement which comprises the combination of shoulders on said liners having engagement with the walls of the casing to lock said liners against movement lengthwise with respect to the casing, and stop flanges on said liners overhanging the outer ends of the shoes and having shouldered engagement with the wedge block to limit outward movement of the latter.

7. In a friction shock absorbing mechanism having a tubular casing with an open friction shell section at one end, detachable liners within the friction shell end of the casing, a central wedge block, friction shoes in wedging engagement with said block and in sliding frictional engagement with said liners, and spring means within the casing yieldingly opposing inward movement of the shoes, the improvement which comprises the combination of shoulders on said detachable liners having engagement with the casing to lock said liners against lengthwise movement, a transverse peripheral shoulder on said central wedge block, and inturned stop flanges on said liners overhanging the outer ends of said shoes and extending into the path of movement of the shoulder of the wedge block to limit outward movement of said block.

8. In a friction shock absorbing mechanism having a tubular friction casing with an open friction shell section at one end, a central wedge block, three friction shoes surrounding said block in wedging engagement therewith, liners interposed between said shoes and the side wall of the casing, said liners and shoes have cooperating frictional surfaces, and spring means within the casing yieldingly opposing inward movement of the shoes, the improvement which comprises the combination of shoulders on said liners having engagement with the casing to lock said liners against lengthwise movement with respect to the casing and inturned flanges on said liners overlying the outer ends of the shoes and extending into the path of movement of the wedge block to limit outward movement of the latter.

9. In a friction shock absorbing mechanism having a tubular friction casing of hexagonal interior cross-section, three liners of V-shaped, transverse section within said casing, said liners being arranged symmetrically about the longitudinal central axis of the casing and each liner being seated against two adjacent walls of said hexagonal interior of the casing, said liners having lengthwise extending friction surfaces of V-shape section on the inner sides thereof, three friction shoes having friction surfaces of V-shaped transverse section interfitting with the V-shaped surfaces of the liners and having lengthwise sliding engagement therewith, a central wedge block in wedging engagement with the shoes, and spring means within the casing yieldingly opposing movement of the shoes, the improvement which comprises the combination of a transversely arranged outwardly projecting rib on each of said liners seated in a transverse groove in the wall of the casing to lock each liner to the casing against movement in lengthwise direction, an inturned stop flange at the outer end of each of said liners, a reduced projecting portion on said wedge block extending between the flanges of the liners, and a peripheral shoulder at the inner end of said reduced projection engageable in back of each of the flanges of said liners to restrict outward movement of said block.

10. In a friction shock absorbing mechanism having a tubular friction casing, a central wedge block, a set of three friction shoes surrounding said block and having wedging engagement therewith, a liner interposed between each shoe and the corresponding interior side wall of the casing, said liner and shoe having cooperating lengthwise extending friction surfaces, and a spring resistance within the casing yieldingly opposing inward movement of the shoes, the improvement which comprises the combination of a peripheral shoulder on said central wedge block, a transversely disposed laterally outwardly extending rib on each liner seated in a locking groove in the corresponding side wall portion of the casing to lock said liner against lengthwise movement with respect to the casing, and inturned flanges, one at the outer end of each of said liners, overhanging the outer ends of the shoes and extending into the path of movement of the shoulder of the wedge block to limit outward movement of said block.

KEITH WILLIAMS.

REFERENCES CITED

The following references are of record in the file of this patent:

UNITED STATES PATENTS

| Number | Name | Date |
| --- | --- | --- |
| 1,121,482 | Courson | Dec. 15, 1914 |
| 1,219,851 | O'Connor | Mar. 20, 1917 |
| 1,562,783 | O'Connor | Nov. 24, 1925 |
| 1,680,337 | O'Connor | Aug. 14, 1928 |
| 1,703,271 | Haseltine | Feb. 26, 1929 |
| 1,741,650 | O'Connor | Dec. 31, 1931 |
| 2,050,541 | Olander | Aug. 11, 1936 |
| 2,076,769 | Dentler | Apr. 13, 1937 |
| 2,291,831 | Olander | Aug. 4, 1942 |
| 2,370,291 | Dath | Feb. 27, 1945 |